(12) United States Patent
Hendriks

(10) Patent No.: US 7,874,720 B2
(45) Date of Patent: Jan. 25, 2011

(54) HYDRAULIC INTERFERENCE KNIVES FOR A VERTICAL AUGER MIXER

(75) Inventor: Jack Hendriks, Millet (CA)

(73) Assignee: Supreme International Limited, Wetaskiwin, AB (CA)

( * ) Notice: Subject to any disclaimer, the term of this patent is extended or adjusted under 35 U.S.C. 154(b) by 865 days.

(21) Appl. No.: 11/777,103

(22) Filed: Jul. 12, 2007

(65) Prior Publication Data

US 2009/0016155 A1 Jan. 15, 2009

(51) Int. Cl.
*B01F 7/24* (2006.01)

(52) U.S. Cl. ............ 366/307; 366/314; 366/603; 241/101.761; 241/101.8

(58) Field of Classification Search ......... 366/302, 366/306, 307, 314, 318–324, 603; 241/101.76, 241/101.761, 101.8, 260.1, 605
See application file for complete search history.

(56) References Cited

U.S. PATENT DOCUMENTS

| | | | | |
|---|---|---|---|---|
| 279,390 | A | | 6/1883 | Hyde |
| 5,175,917 | A | * | 1/1993 | Faccia ............... 29/267 |
| 5,294,064 | A | * | 3/1994 | Faccia ............ 241/101.74 |
| 5,553,937 | A | * | 9/1996 | Faccia ............... 366/302 |
| 5,553,938 | A | * | 9/1996 | Faccia ............... 366/302 |
| 5,647,665 | A | * | 7/1997 | Schuler ............... 366/196 |
| 5,803,375 | A | | 9/1998 | Hartwig |
| 6,834,989 | B2 | | 12/2004 | Tamminga |
| 6,890,092 | B2 | | 5/2005 | Tamminga |
| 6,969,191 | B2 | | 11/2005 | Tamminga |
| 6,983,902 | B2 | * | 1/2006 | Faccia ............ 241/101.761 |
| 7,118,268 | B2 | * | 10/2006 | Van Der Plas ........... 366/314 |
| 7,322,537 | B2 | * | 1/2008 | Faccia ............ 241/101.761 |
| 2004/0245359 | A1 | | 12/2004 | Faccia |
| 2006/0108464 | A1 | * | 5/2006 | Rus ............... 241/260.1 |
| 2009/0016155 | A1 | * | 1/2009 | Hendriks ............... 366/302 |

FOREIGN PATENT DOCUMENTS

| | | |
|---|---|---|
| CA | 2050630 | 9/1991 |
| EP | 704153 A2 * | 4/1996 |
| EP | 1082895 A1 | 9/2000 |
| EP | 1082896 A1 | 9/2000 |
| WO | WO 03030626 A1 * | 4/2003 |

* cited by examiner

*Primary Examiner*—Charles E Cooley
(74) *Attorney, Agent, or Firm*—J. Jay Haugen; Parlee McLaws LLP

(57) ABSTRACT

An interference knife apparatus is provided for use with an environmental material mixer. The mixer includes a tub housing at least one auger with blades mounted on the auger flight. The apparatus includes a post rotatably mounted on the outer sidewall of the mixer tub. The post can include one or more knives extending therefrom. Rotating the post moves the knives in and out of the mixer tub through access slots extending through the mixer's sidewall. The combination of the knives and the auger blades provides a "scissors-like" cutting action for cutting the environmental material during auger rotation.

8 Claims, 8 Drawing Sheets

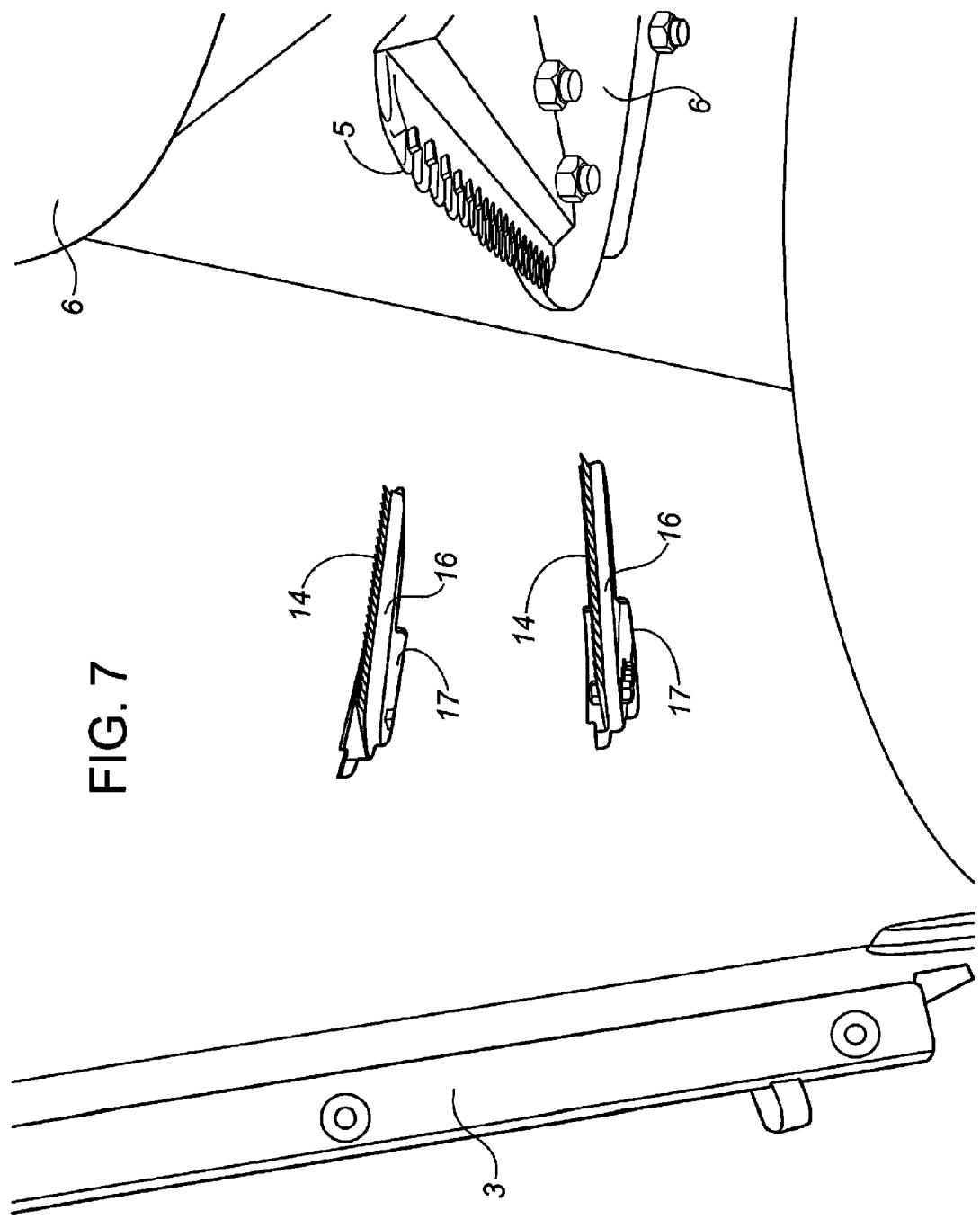

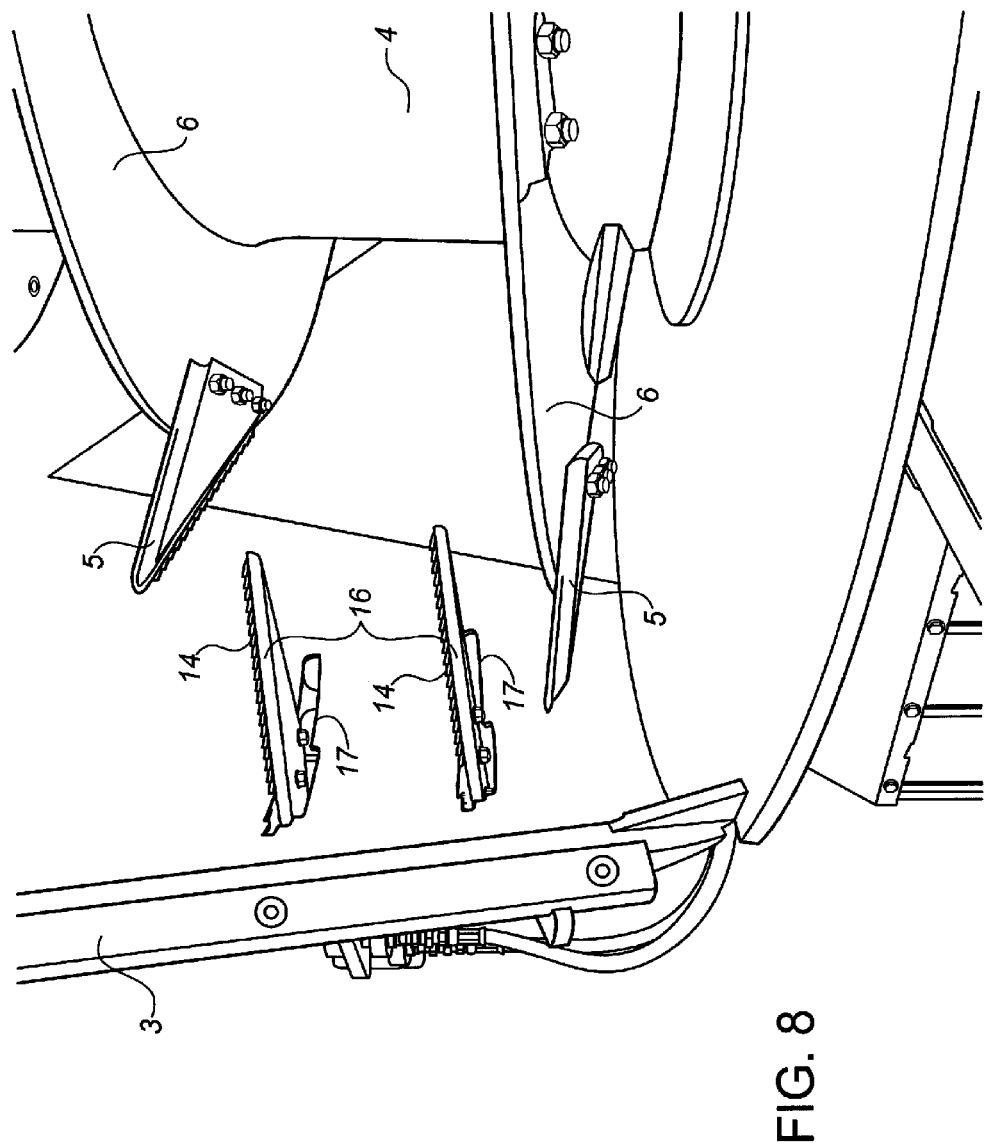

HYDRAULIC INTERFERENCE KNIVES FOR A VERTICAL AUGER MIXER

TECHNICAL FIELD

The present invention is related to the field of interference knives for use in mixer tubs for mixing environmental materials such as biosolids, mortalities, wood, food, and vegetable waste, in particular, vertical mixer tubs having augers.

BACKGROUND

Vertical mixers are used for mixing material for agricultural and other industrial applications. Such mixers can comprise a mixer tub containing one or more vertical augers. Some augers can have blades mounted on the auger flights to help cut the material during auger rotation while the auger mixes the material.

Even with such blades, current mixers lack the ability to quickly and efficiently cut and process certain coarse materials such as biosolids, mortalities, wood, food and vegetable waste (herein after referred to as "environmental materials"). It is, therefore, desirable to provide an interference knife apparatus for use with a mixer to further aid in cutting environmental material where the knife acts in combination with the blades to provide a "scissor like" cutting action that is effective for cutting and processing the material.

SUMMARY

An interference knife apparatus for use in a vertical mixer tub is provided. The mixer tub can comprise one or more vertical augers rotating therein and a plurality of blades mounted on one or more flights on the augers. The mixer tub can further comprise one or more access slots extending through the sidewall of the mixer tub.

In one embodiment, the interference knife apparatus can comprise a post having a longitudinal axis rotatably mounted on the outer sidewall of the mixer. The post can comprise one or more knives disposed thereon, the knives extending away from the post. In this embodiment, rotating the post causes the knives to be moved into or out of the mixer tub through the access slots depending on the direction of the post rotation. In a further embodiment, means to rotate the post are provided. In such embodiments, a telescoping arm can be used to rotate the post. One end of the telescoping arm can be mounted on the mixer tub outer sidewall whereas the other end can be pivotally attached to a crank arm extending from the post. Extending the length of the telescoping arm rotates the post and causes the knives to be moved into the mixer tub through the access slots whereas contracting the length of the telescoping arm can cause the knives to be moved out of the mixer tub. In other embodiments, the telescoping arm can comprise a hydraulic arm, a pneumatic ram or a screw-jack although it will be obvious to those skilled in the art that other means for rotating the post can be used. In further embodiments, the knives can be oriented such that their cutting edges face the cutting edges of the blades disposed on the auger flights. The position of the access slots on the mixer tub sidewall are selected whereby the knives entering the mixer tub through the access slots are disposed between the blades on the rotating auger. In these embodiments, the combination of the knives with the auger blades can provide a "scissors-like" cutting action for cutting the environmental material when the auger is rotating and mixing the material. The "scissors-like" cutting action is analogous to scissor shearing can cut coarse environmental material to a more suitable size and consistency.

The apparatus can be mounted on a mixer tub that, in turn, can be mounted on a frame such as a trailer frame so that the mixer tub can be hauled by a motor vehicle such as a tractor, a truck, etc. In other embodiments the mixer tub can be mounted on the frame of the motor vehicle itself.

Broadly stated, an apparatus is provided for use with a vertical mixer tub for mixing environmental material, the mixer tub comprising at least one auger having a plurality of blades disposed thereon, the mixer tub further comprising at least one access slot extending through the sidewall of the mixer tub, the apparatus comprising: a post having first and second ends defining a longitudinal axis therebetween; mounting means for rotatably mounting the post to an outer sidewall of the mixer tub; rotation means for rotating the post its longitudinal axis when mounted on the mixer tub; and at least one knife extending from the post whereby the at least one knife is configured to move through the at least one access slot into the mixer tub when the apparatus is mounted on the outer sidewall of the mixer tub and the post is rotated about its longitudinal axis, the combination of the at least one knife and the auger blades provided a scissors-like cutting action for cutting the livestock feed material when the auger is rotating.

BRIEF DESCRIPTION OF THE DRAWINGS

FIG. 7 is a side elevation view depicting the interior of the mixer tub of FIG. 2 with the interference knives positioned outside of the access slots.

FIG. 8 is a side elevation view depicting the interior of the mixer tub of FIG. 2 with the interference knives extended through the access slots into the mixer tub.

DETAIL DESCRIPTION OF EMBODIMENTS

Figure 1:
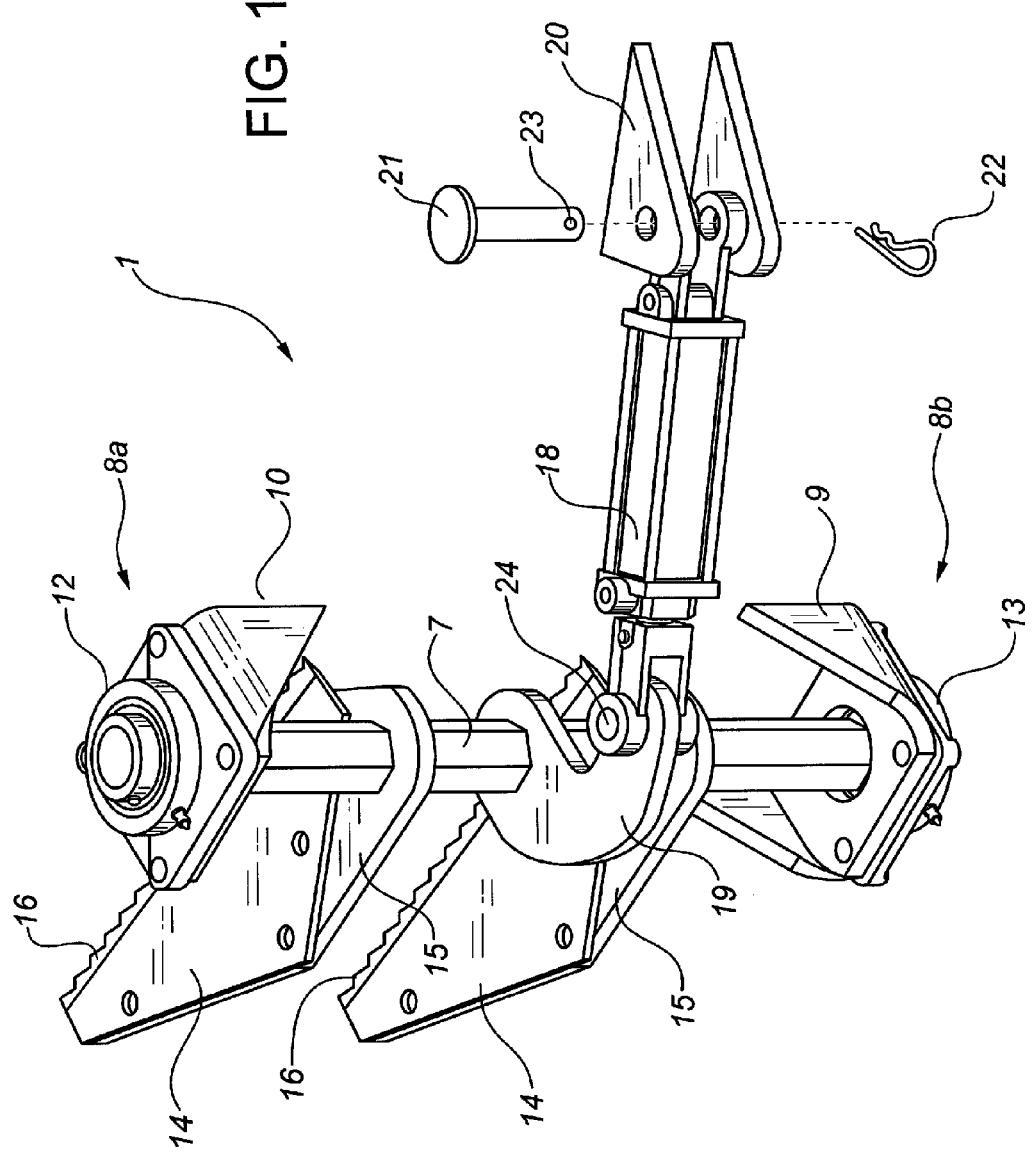
FIG. 1 is a perspective view depicting an interference knife apparatus for use with a vertical mixer tub.

Referring to FIG. 1, interference knife apparatus 1 for use with a environmental material mixer is shown. In the embodiment, apparatus 1 can comprise post 7 having a longitudinal axis. Disposed at each end of post 7 are mounting means 8a and 8b. Mounting means 8a can comprise upper bracket 10 and bearing pillow block 12. Mounting means 8b can comprise lower bracket 9 and bearing pillow block 13. The pillow blocks can be rotatably attached to post 7 to allow post 7 to rotate when brackets 10 and 9 are attached to a feed mixer. In the illustrated embodiment, pillow blocks 12 and 13 can be fastened to brackets 10 and 9 using bolts although it is obvious to those skilled in the art that other fastening means can be used. It is also obvious that the brackets and pillow blocks can be of unitary construction.

Figure 2:
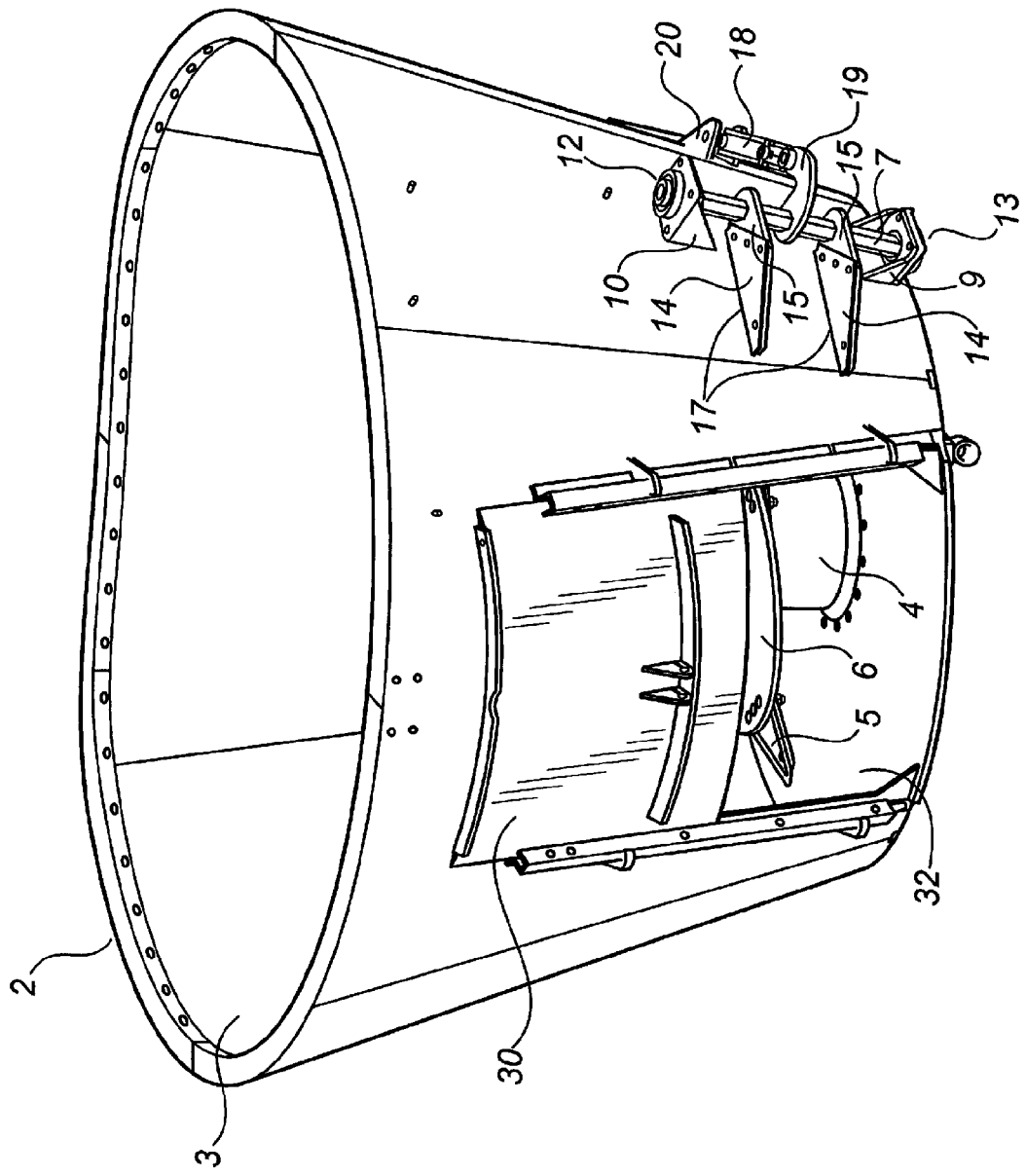
FIG. 2 is a perspective view depicting a vertical mixer tub having the apparatus of FIG. 1 mounted on the outer sidewall of the mixer tub.
Figure 5:
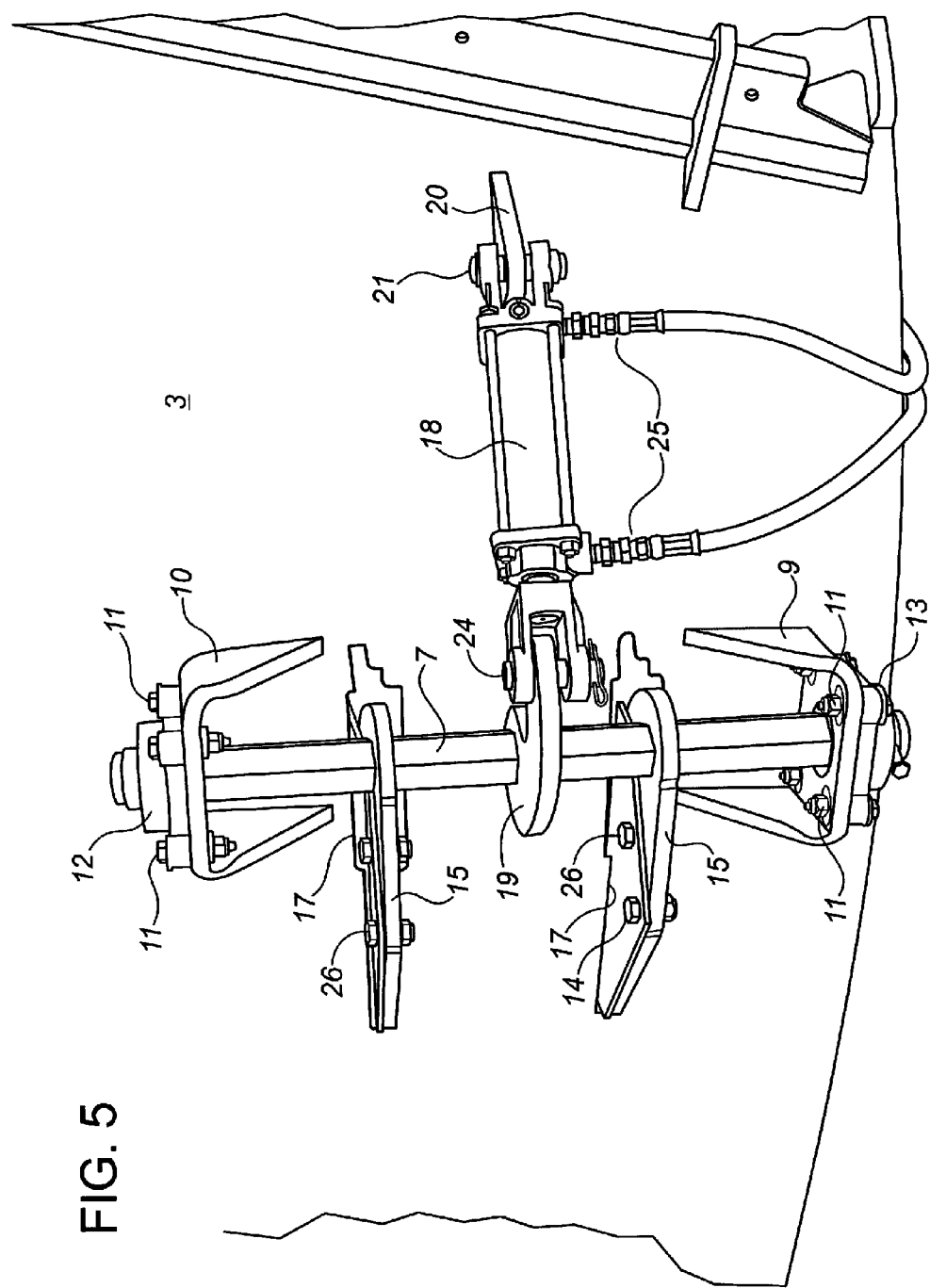
FIG. 5 is a side elevation view depicting the mixer tub of FIG. 2 with the interference knives positioned outside of the access slots.
Figure 6:
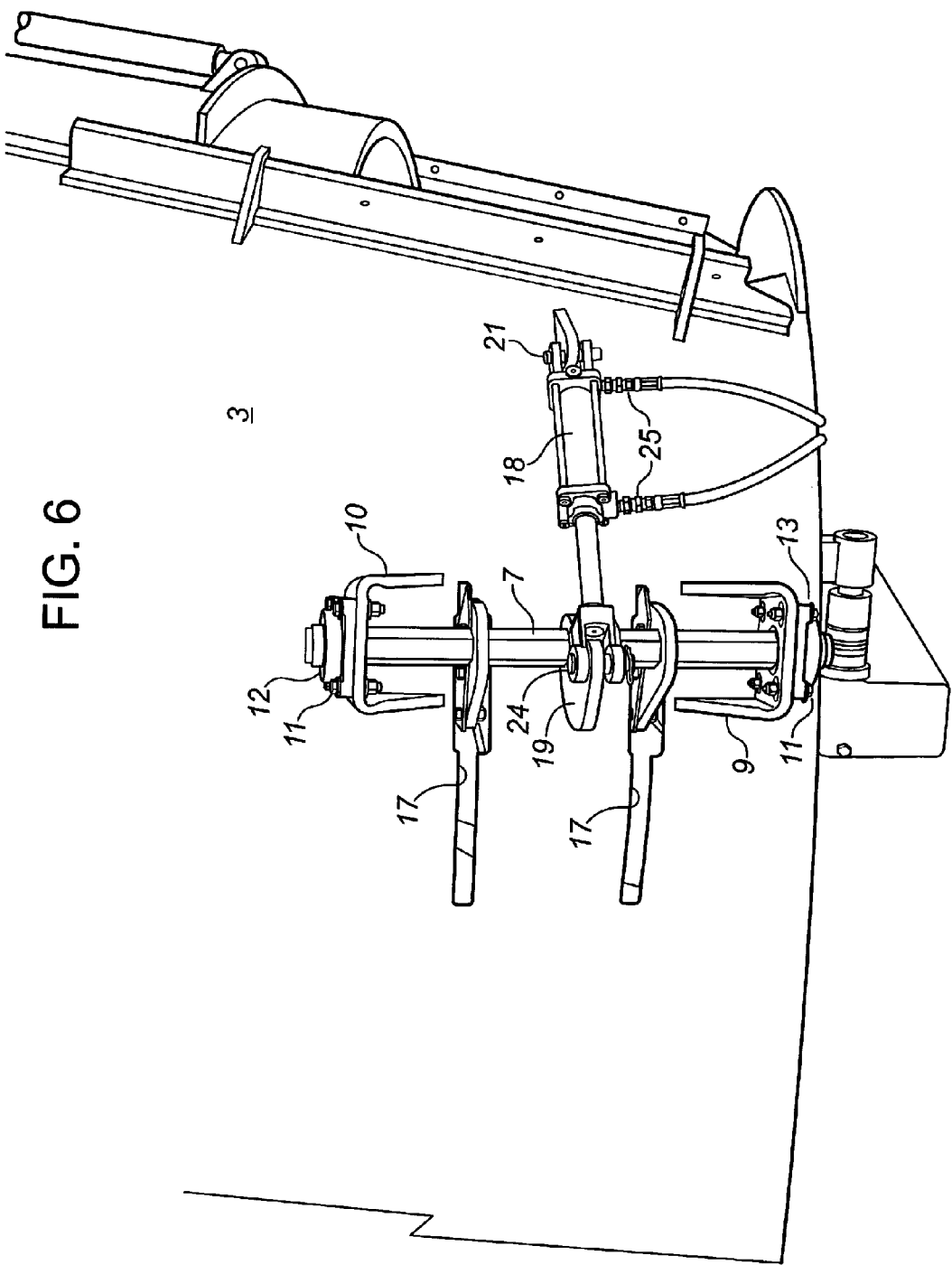
FIG. 6 is a side elevation view depicting the mixer tub of FIG. 2 with the interference knives extended through the access slots into the mixer tub.

As shown in FIGS. 2, 5 and 6, brackets 10 and 9 can be welded to the outer sidewall of mixer tub 3 although brackets can be attached to mixer tub 3 using any suitable fastening means as known to those skilled in the art.

Referring back to FIG. 1, apparatus 1 can also comprise knife arms 15 extending from post 7. Attached at the end of each arm 15 is knife 14 having cutting edge 16. In the illustrated embodiment, two knives 14 extend from post 7 although it is obvious to those skilled in the art that one or more knives 14 can be used. Apparatus 1 can also comprise means for rotating post 7. In one embodiment, the means to rotate post 7 can comprise post arm 19, ram 18 and ram mounting bracket 20. Post arm 19 extends from post 7 and can couple to ram 18 with pin 24. Ram 18 can be coupled to bracket 20, which can be attached to outer sidewall of a mixer tub by welding or other suitable fastening means. Ram 18 acts as a telescoping arm that rotates post 7. In the illustrated embodiment, post 7 will rotate clockwise (when viewed from above) when ram 18 is extended in length, and rotate counterclockwise ram 18 is contracted in length. Pin 21 can be secured by placing cotter pin 22 through hole 23 after pin 21 has been inserted through holes on bracket 20 and ram 18. Pin 24 can similarly be secured although its cotter pin is not shown in FIG. 1. In the illustrated embodiment, ram 18 is a hydraulic ram although alternatives such as pneumatic rams, screw-jacks or other similar devices can be used to rotate post 7.

Figure 3:
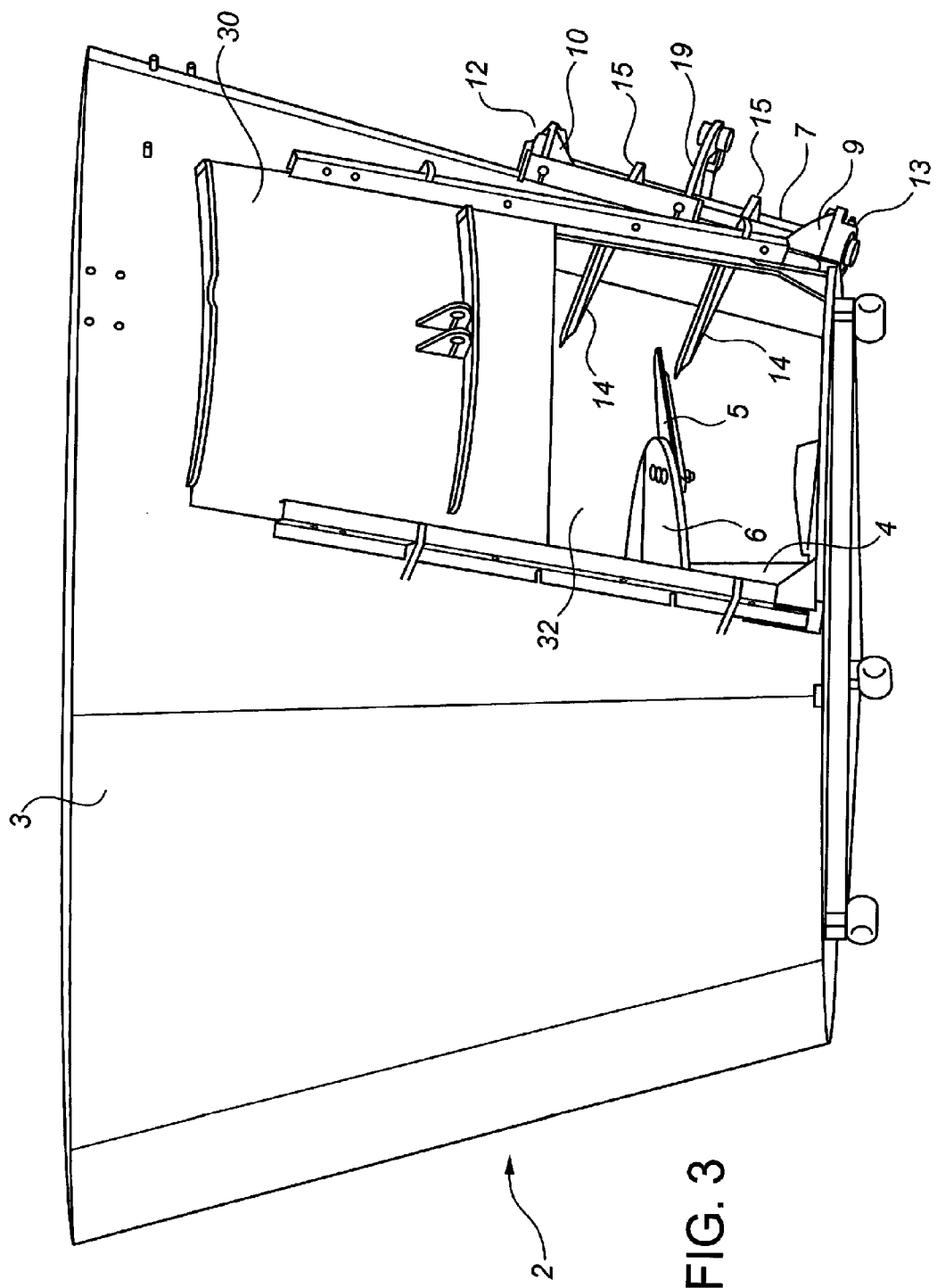
FIG. 3 is a side elevation view depicting the mixer tub of FIG. 2.
Figure 4:
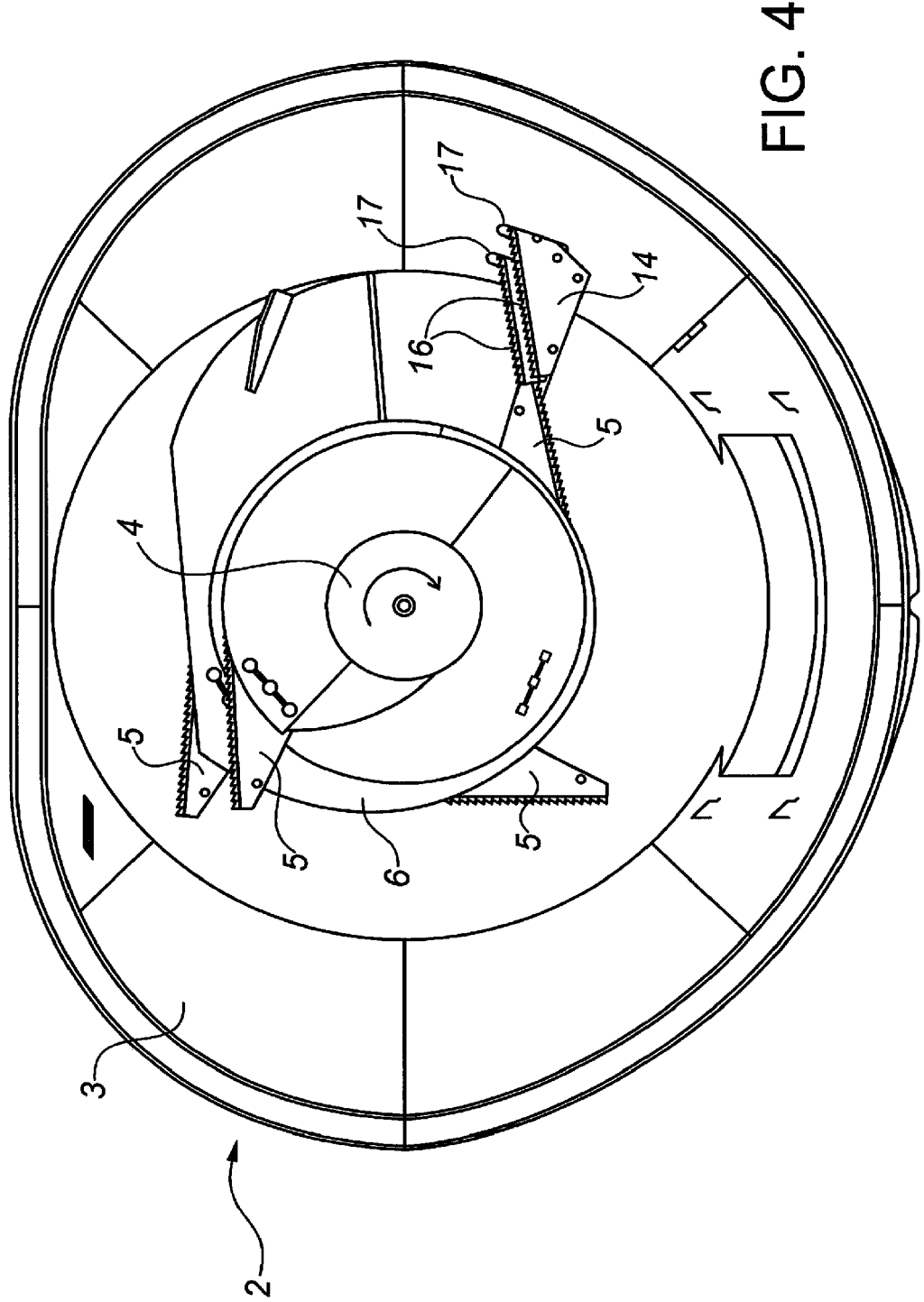
FIG. 4 is a top plan view depicting the mixer tub of FIG. 2.

Referring to FIG. 2, apparatus 1 is shown disposed on the outer sidewall of mixer tub 3. As illustrated, discharge door 30 is raised in opening 32 to reveal auger 4 having an auger flight 6 and a blade 5 disposed thereon. Apparatus 1 is shown having knives 14 at the entrance of access slots 17. Referring to FIG. 3, apparatus 1 is shown having knives 14 extending into mixer tub 3 through access slots 17 (not shown in this figure). Referring to FIG. 4, a top view of mixer tub 3 is shown with knives 14 extending through access slots 17.

Referring to FIG. 5, a representative embodiment of apparatus 1 is shown mounted on the outer sidewall of mixer tub 3 where knives 14 are at the entrance of access slots 17. In this embodiment, brackets 10 and 9 are welded to the outer sidewall of mixer tub 3 with bearing pillow blocks 12 and 13 mounted to brackets 10 and 9, respectively, using bolts 11. Knives 14 are shown attached to arms 15 using bolts 26. This allows knives 14 to be replaced if they become worn although it should be obvious that knives 14 and arms 15 can be of unitary construction. Ram 18 is coupled to hydraulic hoses 25 that provide a supply of pressurized hydraulic fluid from a hydraulic fluid pump system (not shown) to extend and contract ram 18.

Referring to FIG. 6, ram 18 is shown in an extended position whereby knives 14 are extending into mixer tub 3 through access slots 17. Referring to FIGS. 7 and 8, mixer tub 3 is shown with knives 14 retracted from and extending into the interior of mixer tub 3, respectively. When knives 14 are extended into mixer tub 3, cutting edges 16 are opposing the cutting edges of blades 5 mounted on flights 6 of auger 4. Access slots 17 are positioned on mixer tub 3 such that knives 14 are disposed above, below or in-between blades 5 as auger 4 is rotating.

With this configuration of knives 4 and blades 5 the combination of knives 14 and blades 5 provide a "scissors-like" cutting action to cut environmental material in mixer tub 3 when auger 4 is rotating. Adjusting how far knives 14 are extended into mixer tub 3 can affect how the environmental material is cut. The use of a ram to control the knife movement allows the knives to be moved to a desired position and kept in that position while auger 4 is rotating.

Although a few embodiments have been shown and described, it will be appreciated by those skilled in the art that various changes and modifications might be made without departing from the scope of the invention. The terms and expressions used in the preceding specification have been used herein as terms of description and not of limitation, and there is no intention in the use of such terms and expressions of excluding equivalents of the features shown and described or portions thereof, it being recognized that the scope of the invention is defined and limited only by the claims that follow.

What is claimed is:

1. A vertical mixer tub for mixing environmental materials, the mixer tub comprising at least one auger having a plurality of blades disposed thereon, the mixer tub further comprising at least one access slot extending through the sidewall of the mixer tub, the improvement characterized by an apparatus comprising:
   a) a post having first and second ends defining a longitudinal axis therebetween;
   b) mounting means for rotatably mounting the post to an outer sidewall of the mixer tub; wherein the mounting means further comprises first and second mounting brackets rotatably attached to the first and second ends, respectively, of the post;
   c) rotation means for rotating the post about its longitudinal axis when mounted on the mixer tub; and
   d) at least one knife extending from the post whereby the at least one knife is configured to move through the at least one access slot into the mixer tub when the apparatus is mounted on the outer sidewall of the mixer tub and the post is rotated about its longitudinal axis, the combination of the at least one knife and the auger blades providing a scissors-like cutting action for cutting the environmental material when the auger is rotating.

2. The mixer tub as set forth in claim 1 wherein the rotation means further comprises:
   a) a crank arm extending from the post;
   b) a third mounting bracket for mounting to the outer sidewall of the mixer tub; and
   c) a telescoping arm operatively coupled to the third mounting bracket and the crank arm whereby extending the telescoping arm moves the at least one knife into the mixer tub through the at least one access slot and contracting the telescoping arm withdraws the at least one knife from the at least one access slot.

3. The mixer tub as set forth in claim 2 wherein the telescoping arm further comprises a hydraulic ram, a pneumatic ram or a screw-jack.

4. The mixer tub as set forth in claim 1 further comprising a trailer frame configured for being towed by a motor vehicle whereby the mixer tub is disposed on top of the trailer frame.

5. The mixer tub as set forth in claim 1 further comprising a motor vehicle whereby the mixer tub is disposed on the motor vehicle.

6. An apparatus for use with a vertical mixer tub for mixing livestock feed material, the mixer tub comprising at least one auger having a plurality of blades disposed thereon, the mixer tub further comprising at least one access slot extending through the sidewall of the mixer tub, the apparatus comprising:
   a) a post having first and second ends defining a longitudinal axis therebetween;
   b) mounting means for rotatably mounting the post to an outer sidewall of the mixer tub; wherein the mounting means further comprises first and second mounting brackets rotatably attached to the first and second ends, respectively, of the post;
   c) rotation means for rotating the post about its longitudinal axis when mounted on the mixer tub; and
   d) at least one knife extending from the post whereby the at least one knife is configured to move through the at least one access slot into the mixer tub when the apparatus is mounted on the outer sidewall of the mixer tub and the post is rotated about its longitudinal axis, the combination of the at least one knife and the auger blades providing a scissors-like cutting action for cutting the environmental material when the auger is rotating.

7. The apparatus as set forth in claim 6 wherein the rotation means further comprises:
   a) a crank arm extending from the post;
   b) a third mounting bracket for mounting to the outer sidewall of the mixer tub; and
   c) a telescoping arm operatively coupled to the third mounting bracket and the crank arm whereby extending the telescoping arm moves the at least one knife into the mixer tub through the at least one access slot and contracting the telescoping arm withdraws the at least one knife from the at least one access slot.

8. The apparatus as set forth in claim 7 wherein the telescoping arm further comprises a hydraulic ram, a pneumatic ram or a screw-jack.

* * * * *

UNITED STATES PATENT AND TRADEMARK OFFICE
CERTIFICATE OF CORRECTION

PATENT NO.        : 7,874,720 B2                                              Page 1 of 1
APPLICATION NO.   : 11/777103
DATED             : January 25, 2011
INVENTOR(S)       : Jack Hendriks It is certified that error appears in the above-identified patent and that said Letters Patent is hereby corrected as shown below:

IN THE SPECIFICATIONS:
Column 2, line 4, change "embodiments the" to -- embodiments, the --;

IN THE CLAIMS:
Claim 1, Column 4, line 17, change "tub;" to -- tub, --; and
Claim 6, Column 4, line 60, change "tub;" to -- tub, --.

Signed and Sealed this
Tenth Day of May, 2011

David J. Kappos
*Director of the United States Patent and Trademark Office*